June 9, 1964          J. H. DAVIS          3,136,203

BLIND RIVET HAVING MEANS FOR RETAINING THE EXPANSION BOLT

Filed Nov. 29, 1960

INVENTOR.
JOHN H. DAVIS

BY
ATTORNEYS

United States Patent Office 3,136,203
Patented June 9, 1964

3,136,203
BLIND RIVET HAVING MEANS FOR RETAINING THE EXPANSION BOLT
John H. Davis, Fort Worth, Tex., assignor to General Dynamics Corporation, San Diego, Calif., a corporation of Delaware
Filed Nov. 29, 1960, Ser. No. 72,460
3 Claims. (Cl. 85—40)

The present invention relates generally to fastening devices, and more particularly to an improved composite fastening device which is adapted for blind installation and easy removal.

In the manufacture of certain types of machinery, vehicles, etc., situations frequently arise in which the assembly of two or more parts is complicated because access cannot be had to the underside of the assembled structure. An outstanding example of such a situation occurs in the manufacture of present day, high speed aircraft. Most aircraft of this type employ an airframe comprising a relatively lightweight understructure of longerons, bulkheads, spars, etc., over which are attached external, load carrying panels, usually of a bonded or brazed, cored configuration. In order to achieve maximum aerodynamic efficiency, the wing section of such aircraft is generally quite thin, thus greatly restricting access to the interior of the wing and making it necessary to employ a fastening device whose installation may be accomplished from the outside thereof. Since the installed panels frequently serve to define an integral fuel tank, such a fastening device should be readily adaptable to conventional sealing methods. It is also desirable that the fastener be easy to disengage in the event that a wing panel must be removed to repair a fuel pump, valve, or other fuel system equipment.

Several different fastening devices have been employed in the above application. Tapping bosses have been provided on the understructure for use with standard bolts. Nut plates are frequently installed on the underside of the understructure, and blind rivets have often been used.

Numerous disadvantages are inherent in all these fastening devices. Tapping booses, in addition to imposing an excessive weight penalty on the aircraft, are time consuming and expensive to fabricate. Nut plates are also time consuming and expensive to install and cannot be satisfactorily installed on contoured or tapered surfaces, which are frequently encountered on aircraft structures. Blind bolts require special tools for installation, are subject to sonic fatigue due to jet engine noise, are difficult to seal, and their removal results in drill cuttings being deposited in the fuel tank.

The instant fastening device consists of a hollow case provided with an expansible portion, which when compressed by means of a bolt, expands radially outwardly forming a locking ring on the underside of the understructure. The present fastener is also adapted for blind installation, is readily sealable and is easy to remove.

In addition to the above advantages, the subject fastening device is simply and quickly installed, no special tools are required for installation or removal, may be installed on contoured or tapered surfaces and has exceptionally high strength characteristics.

It is, therefore, an object of the present invention to provide an improved fastening device for attaching two or more structural elements together which is adapted for blind installation and easy removal.

Another object is the provision of an improved blind fastening device which may be installed with standard hand tools and which is readily sealable by conventional sealing methods.

Another object of the invention resides in the provision of an improved blind fastening device which may be simply and quickly installed.

Another object is to provide an improved fastening device of the class described which has high strength characteristics.

These and other objects and advantages of the invention will become more apparent from a consideration of the appended drawings wherein.

Figures 1, 2:
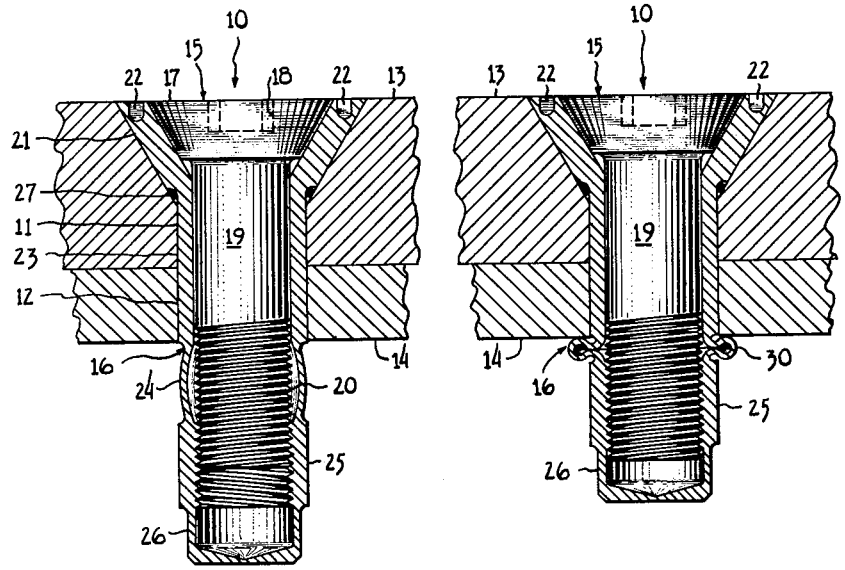
FIGURE 1 is a partial cross sectional view of the fastening device as inserted through a pair of structural members which are to be joined together.
FIGURE 2 shows the fastening device, in section, after final installation.

Referring now to the drawings, in FIGURE 1 the fastening device, generally indicated by the numeral 10, is shown inserted through holes 11 and 12 in structural panel 13 and understructure 14, respectively. The fastening device comprises a bolt 15 and a hollow, bolt-receiving case 16. The bolt is of conventional design and includes a head 17, countersunk in the configuration shown, provided with an Allen wrench or other suitable driving recess 18 (illustrated by the broken lines), and a shank 19 having a threaded end section 20. The case includes a head portion 21, a shank portion 23, an intermediate or expansive portion 24, and an internally threaded section or nut 25 which serves to engage the bolt threads 20. The head portion is internally countersunk to accommodate the bolt head 17 and has tool receiving slots 22 in its top surface. In applications where sealing is required, the case is provided with an end cap, as at 26, which is preferably integrally connected to the nut section 25. Such end cap serves to preclude fluid leakage between the case and bolt. Leakage around the periphery of the case may be prevented by positioning an O-ring 27 about the case beneath the head.

The intermediate portion 24 is formed by removing material from the periphery of the case in an area intermediate the shank and nut, thus creating an area of reduced wall thickness. After the material has been removed, the intermediate portion is bowed outwardly until the diameter thereof is equal to or slightly less than that of the remainder of the shank. Thus formed, the intermediate portion 24 is relatively easy to compress and serves to define the location at which the locking ring 30 will be formed. For a given application the position of the intermediate or expansive portion 24 on the case is determined by the combined thickness of the structural elements which are to be attached together. It is preferable that the upper edge of the intermediate portion be adjacent the lower surface of the understructure when the case is fully inserted into the hole. In this manner there is a maximum amount of material available for formation of the locking ring 30.

To attach the panel 13 to the understructure 14, the holes 11 and 12 are drilled in the structural members. The holes are then aligned and the fastening device 10 is inserted therethrough. The bolt 15 and case 16 may be assembled either before or after insertion through the panel and understructure. If the components are assembled prior to such insertion, care should be exercised not to tighten the bolt to the extent that the intermediate portion is expanded to a diameter larger than that of the holes 11 and 12. After the fastening device has been inserted as described, a spanner wrench or other suitable tool is employed to engage tool receiving slots 22 in case head 21 and thus prevent rotation of the case. An Allen wrench is then engaged with driving recess 18 in bolt head 17 and the bolt tightened. Such tightening results in simultaneous compression and radial expansion outwardly of the intermediate portion 24 to form a locking ring 30 on the underside of understructure 14, as shown in FIGURE 2. Since in many applications in which the present invention will be used the person installing the fastening device will not be able to observe the intermediate portion directly during such installation, it is desirable that the torque necessary to fully compress the intermediate portion be determined for each size fastening device of a particular material so that the fastening device will not be inadvertently overtorqued. For example, a fastening device made of stainless steel with a wall thickness at the intermediate portion of .016 and a bolt diameter of ¼ inch requires a torque of 140 inch-pounds for full compression.

In addition to serving as a locking ring to secure the structural components together, the expanded intermediate portion also functions to prevent loosening of the bolt from the nut. When the intermediate portion is fully compressed, it forms what may be considered a compression spring which tends to return, at least partially, to its original, uncompressed configuration. It thus exerts, through the threads of the nut portion, a tension force upon the bolt threads which thereby locks the case and bolt against relative motion and thus prevents their becoming loosened. Additional locking means, such as a slight inward deformation of the threads of the sleeve bolt, may be employed if needed in a particular application. Should, however, the bolt become loosened, as for example, under conditions of severe sonic vibrations, it may be retightened in the manner already described to again secure the structural members together.

In the event that it should become necessary to disassemble the panel from the understructure, removal of the fastening device is easily accomplished by backing the bolt part way out of the case and striking the bolt head with a hammer or other suitable implement, which drives the bolt back into the case causing the locking ring to elongate axially and contract laterally. When the locking ring has been sufficiently deformed that the diameter thereof is no larger than that of the remainder of the case, the fastening device may be easily removed from the hole.

Figure 3:
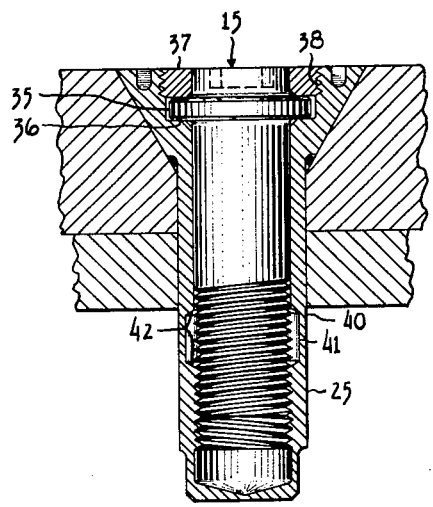
FIGURE 3 illustrates alternate configurations of the bolt head and compressible portion of the case.

In FIGURE 3 there is shown an alternate configuration of the fastening device wherein different bolt and intermediate portion configurations are employed. The bolt 15 in this instance is provided with a circumferential collar 35 near its upper end which seats upon a shoulder 36 within the head 21 of case 16. After the bolt has been fully inserted into the case, an externally threaded retainer ring 37 is engaged with internal threads 38 in head 21 above the shoulder 36 and tightened until the lower surface of such retainer ring barely contacts the upper surface of the collar. Care should be taken in tightening the retainer so as not to bind the collar and thus inhibit rotation of the bolt. When the retainer ring has been properly tightened, it is desirable to lock such ring in position by peen staking or other suitable method.

The case intermediate portion 40 in this instance is formed by removing material from the inner wall of the case 16 thus forming a groove having a flat surface 41 concentric with the outer surface of the case. Such surface is interconnected with the case inner wall by tapered shoulders 42, which serve to assure that the intermediate portion will expand when subjected to the compressive force generated by the tightening of bolt 15. The angle of taper of shoulders 42 generally determines the torque necessary to fully compress the intermediate portion. It has been found that a sixty degree taper, measured between the case axis and the shoulders surface, is best suited for the practice of the invention.

In the present configuration, removal of the fastening device is effected by merely turning the bolt, while holding the case stationary, in a counterclockwise direction (assuming right hand threads). The retainer ring prevents the bolt from moving upward and out of the case, and thus forces the nut 25 to move downward, which elongates the expanded intermediate portion eventually to a diameter which is no larger than the rest of the case.

Although certain specific embodiments of the present invention have been herein illustrated and described, it is not to be construed that the invention is limited thereto, as many modifications will be apparent to those skilled in the art; and the invention is to be given the broadest interpretation possible within the meaning and scope of the following claims.

What is claimed is:

1. A fastening device comprising a hollow bolt-receiving case having a head portion and an internally threaded portion, said head portion of said case having a recess therein, bolt means for moving said threaded portion of said case toward said head portion of said case, said bolt means including a threaded section at one end and an integral circumferential collar near the opposite end, said collar being capable of fitting into said recess when said bolt is positioned in said case, retainer means coacting with said recess and said collar for holding said bolt in said case, and expansible means integral with said case and positioned between said head portion and said threaded portion for expanding radially outwardly in response to movement of said threaded portion toward said head portion.

2. A composite fastening for attaching structural members together and adapted for blind installation comprising a bolt, a hollow case and an externally threaded retainer ring, said bolt including a threaded section at one end and an integral, circumferential collar near the opposite end, said case including a head portion having a recess therein and a shoulder below said recess upon which said collar seats, said recess being internally threaded to engage said retainer ring, said case also including a shank portion, an intermediate portion, and an internally threaded nut portion, the wall thickness of said intermediate portion being less than the wall thickness of said shank, whereby said intermediate portion is expanded to form a locking ring on the underside of said structural members as said bolt is engaged and tightened with said nut portion.

3. A fastening device comprising a hollow bolt receiving case having an inner wall, a head portion and an internally threaded portion, said head portion of said case having a recess therein, bolt means for moving said threaded portion of said case toward said head portion of said case, said bolt means including a threaded section at one end and an integral circumferential collar near the opposite end, said collar being capable of fitting into said recess when said bolt is positioned in said case, retainer means coacting with said recess in said collar for holding said bolt in said case, expansible means integral with said case and positioned between said head portion and said threaded portion for expanding radially outwardly in response to movement of said threaded portion toward said head portion, said expansible portion having a wall thickness less than that of said shank portion and being grooved from said inner wall of said case forming a grooved internal surface, said grooved surface being connected to said inner wall by tapering shoulders.

References Cited in the file of this patent

UNITED STATES PATENTS

| | | |
|---|---|---|
| 1,188,876 | Allen | June 27, 1916 |
| 2,030,166 | Huck | Feb. 11, 1936 |
| 2,760,400 | Mills | Aug. 28, 1956 |
| 2,863,351 | Vaughn | Dec. 9, 1958 |
| 2,884,099 | Nenzell | Apr. 28, 1959 |

FOREIGN PATENTS

| | | |
|---|---|---|
| 982,415 | France | June 11, 1951 |
| 838,518 | Great Britain | June 22, 1960 |

Disclaimer 3,136,203.—*John H. Davis*, Fort Worth, Tex. BLIND RIVET HAVING MEANS FOR RETAINING THE EXPANSION BOLT. Patent dated June 9, 1964. Disclaimer filed May 25, 1965, by the assignee, *General Dynamics Corporation*.

Hereby enters this disclaimer to claim 3 of said patent.

[*Official Gazette September 21, 1965.*]